(12) United States Patent
Galomb (10) Patent No.: US 9,623,387 B1
(45) Date of Patent: Apr. 18, 2017

(54) MIXING TOOL WITH INTEGRATED MATERIAL STRIPPING ELEMENT

(71) Applicant: David E. Galomb, Allentown, PA (US)

(72) Inventor: David E. Galomb, Allentown, PA (US)

(73) Assignee: GALOMB, INC., Allentown, PA (US)

( * ) Notice: Subject to any disclaimer, the term of this patent is extended or adjusted under 35 U.S.C. 154(b) by 0 days.

(21) Appl. No.: 14/201,796

(22) Filed: Mar. 8, 2014

Related U.S. Application Data (60) Provisional application No. 61/776,758, filed on Mar. 11, 2013, provisional application No. 61/776,765, filed on Mar. 11, 2013, provisional application No. 61/776,767, filed on Mar. 11, 2013, provisional application No. 61/777,500, filed on Mar. 12, 2013, provisional application No. 61/801,888, filed on Mar. 15, 2013.

(51) Int. Cl.
*B01F 13/00* (2006.01)

(52) U.S. Cl.
CPC ............ *B01F 13/00* (2013.01); *B01F 13/002* (2013.01)

(58) Field of Classification Search
CPC ......... B01F 13/002; A47J 43/04; A47J 43/082
USPC ............... 366/129, 343, 345, 308, 285, 286, 366/309–313
See application file for complete search history.

(56) References Cited

U.S. PATENT DOCUMENTS

| | | | | |
|---|---|---|---|---|
| 1,801,084 A | * | 4/1931 | Huie | A47G 21/023 294/61 |
| 1,928,022 A | * | 9/1933 | Little | A47J 43/1037 366/129 |
| 2,092,353 A | * | 9/1937 | Kyseth | A47J 43/27 366/343 |
| 4,900,159 A | * | 2/1990 | Jamison | B01F 7/005 366/262 |
| 8,025,436 B2 | * | 9/2011 | Hensler | 366/129 |
| 8,307,491 B1 | * | 11/2012 | Michel | 366/342 |
| 2004/0141407 A1 | * | 7/2004 | Settele | 366/129 |
| 2005/0007869 A1 | * | 1/2005 | Venus | B01F 7/001 366/129 |

OTHER PUBLICATIONS

Commercial Literature: The "Mini-Compounder KETSE Dec. 1936" manufactured and sold by C.W. Brabender® Instruments, Inc. located in South Hackensack, New Jersey, USA.
Commercial Literature: The "LME Laboratory Mixing Extruder" manufactured and sold by Dynisco, located in Franklin, Massachusetts, USA.
Commercial Literature: The "LMM Laboratory Mixing Molder" manufactured and sold by Dynisco, located in Franklin, Massachusetts, USA.
Commercial Literature: The "RCP-0250 Microtruder" manufactured and sold by Randcastle Extrusion Systems, Inc., located in Cedar Grove, New Jersey, USA.
Commercial Literature: The "DSM Xplore 5ml Micro-compounder" manufactured and sold by DSM Xplore located in the Netherlands.
Commercial Literature: The "DSM Xplore Micro Injection Moulding Machine" manufactured and sold by DSM Xplore located in the Netherlands.

(Continued)

*Primary Examiner* — Tony G Soohoo
*Assistant Examiner* — Anshu Bhatia (57) ABSTRACT

A mixing tool with an integrated stripping element for removing material residue from its embodied mixing element.

8 Claims, 6 Drawing Sheets

(56) References Cited

OTHER PUBLICATIONS

Commercial Literature: The "MicroInjector" manufactured and sold by DACA Systems located in Goleta, California, USA.
Commercial Literature: The "Microcompounder" manufactured and sold by DACA Systems located in Goleta, California, USA.
Commercial Literature: The "Thermo Scientific Haake MiniLab II Micro-Compounder" manufactured and sold by Thermo Scientific, located in Waltham, Massachusetts.
Academic paper entitled: "Improving Polymer Blend Dispersions in Mini-mixers" by Milan Maric and Christopher W. Macosko. Published in Polymer Engineering and Science, Jan. 2001, vol. 41 No. 1.
Academic paper entitled: "A Novel Miniature Mixing Device for Polymeric Blends and Compounds" by Martin Sentmanat, Savvas G. Hatzikiriakos, and Christos Stamboulides. Published by Polymer Engineering and Science 2009 vol. 49 Issue 11.

* cited by examiner

MIXING TOOL WITH INTEGRATED MATERIAL STRIPPING ELEMENT

CROSS-REFERENCE TO RELATED APPLICATIONS

This application claims priority under 35 U.S. Code §119 of U.S. Provisional Application Ser. Nos. 61/776,758 and 61/776,765 and 61/776,767 all filed on Mar. 11, 2013, and 61/777,500 filed on Mar. 12, 2013, and 61/801,888 filed on Mar. 15, 2013, all of which are hereby incorporated by reference in their entireties.

This application is also related to co-pending applications entitled: Support Apparatus for Injection Tube Assembly; Material Stripping Apparatus for External Mixing Element; System and Method for Mixing Polymers and Producing an Injection Molded Part; Injection Tube Assembly with Integrated Material Stripping Element and a Polymer Mixing System for Employing the Same, all filed on the same day as this U.S. Non-Provisional application and all hereby incorporated by reference in their respective entireties.

FIELD

The field relates generally to laboratory size apparatuses and systems for melting, mixing and processing polymers. The field also relates generally to mixing tools, and particularly to a mixing tool with an integrated material stripping element.

BACKGROUND

Polymers are often distinguished from other materials because they tend to have special challenges when mixing them, such as having to be melted at relatively high temperatures before they can be mixed, and often being very viscous and sticky in their molten state. Most polymers also have a narrow window in time to complete the mixing operation at the elevated temperature before they begin to degrade.

By and large polymers (e.g. thermoplastics) are mixed commercially via what is commonly referred to as continuous processing equipment, such as production type extruders and injection molding machines. Whereby the desired polymer is continually fed into such machines, usually along with some other additive, such as a colorant or filler, where it is melted and mixed with the said additive during the process of forming it into a desired shape, such as a plastic injected molded part, or an extruded profile.

These systems and machines work well for producing many parts very quickly, but are typically large in size, weighing thousands of pounds, and require extensive set-up time and rigorous process control to operate, and are very expensive.

These attributes also make them very difficult and inconvenient to use if one wishes to just make one part or a few parts for evaluation or testing purposes. Testing and evaluating a polymer before attempting to use it commercially in a product is almost always a prerequisite, so regardless of the cost and inconvenience, it is usually done.

Additionally, scientists and researchers are greatly hindered in their attempts to quickly develop and test new polymer formulations and mixtures when they are forced to use these large production machines to melt, mix and mold their test samples.

There are companies who have attempted to address this problem with varying degrees of success. Some have created essentially mini versions of production line equipment allowing it to be used in a laboratory environment to melt and mix the polymers and then either extrude the mixed material into a desired profile or form it into an injection molded part. Others have created stand alone machines and devices, also suitable for use in a laboratory environment to melt and mix a desired polymer, and then expel it in molten form, so the user can evaluate the mixed material. Although the line between a stand-alone melt and mixing machine and a mini-production system is somewhat blurred because some systems are comprised of multiple machines or apparatuses that are either used in cooperation with each other or attached together as add-on pieces of equipment for further downline processing of the mixed molten polymer.

Some equipment and systems known to the applicant for melting, mixing and processing polymers on a laboratory scale are as follows:

The "Mini-Compounder KETSE 12/36" manufactured and sold by C.W. Brabender® Instruments, Inc. located in South Hackensack, N.J., USA The "LME Laboratory Mixing Extruder" manufactured and sold by Dynisco, located in Franklin, Mass., USA The "LMM Laboratory Mixing Molder" manufactured and sold by Dynisco, located in Franklin, Mass., USA The "RCP-0250 Microtruder" manufactured and sold by Randcastle Extrusion Systems, Inc., located in Cedar Grove, N.J., USA The "DSM Xplore 5 ml Micro-compounder" manufactured and sold by DSM Xplore located in the Netherlands.

The "DSM Xplore Micro Injection Moulding Machine" manufactured and sold by DSM Xplore located in the Netherlands.

The "MicroInjector" manufactured and sold by DACA Systems located in Goleta, Calif., USA.

The "Microcompounder" manufactured and sold by DACA Systems located in Goleta, Calif., USA.

The "Thermo Scientific Haake MiniLab II Micro-Compounder" manufactured and sold by Thermo Scientific, located in Waltham, Mass.

Also known is an academic paper (published in Polymer Engineering and Science, January 2001, Vol. 41 No. 1) entitled: "Improving Polymer Blend Dispersions in Mini-mixers" by Milan Marie and Christopher W. Macosko. The researchers in that study evaluated several different laboratory size polymer mixing systems and machines on the market and compared them against each other, noting some of the shortcomings of each.

Although the apparatuses and systems on the market today may be suitable for their intended purposes, they all fall short of most users' desires in some way. The mini-production line systems are still very expensive and still require a significant amount of process control to operate. They are also cumbersome to clean and maintain and take up a lot of laboratory space. The stand-alone machines are also expensive and although smaller, they are also difficult to clean and maintain, plus they carry additional limitations and drawbacks, such as in some cases producing inferior mixing quality.

In any case, it is clearly evident there still remains a great unmet need for a simpler, more affordable, easier to operate, easier to clean and maintain, versatile, robust system that can melt, mix and process polymers in a laboratory environment with consistent high quality. What is disclosed hereafter is the answer to that great unmet need.

SUMMARY

A mixing tool apparatus comprising: a handle; a shaft; a repositionable mixing element assembly; and a material stripping element. The tool may be either hand held or attached to an automated mixing device. With the mixing element assembly in its retracted position on the shaft, the tool is typically first positioned over a vessel containing the material desired to be mixed, with the stripping element portion of the tool in close communication with the vessel to effectively cover its opening. The mixing element portion of the tool is then extended through the stripping element and into the vessel by sliding the mixing element assembly down the shaft of the tool. The lock screw is then tightened to keep it in that extended position. The tool is then rotated, either by hand or automatically, to mix the material in the vessel. When the mixing operation is complete, the lock screw is loosened and the mixing element is withdrawn from the vessel by sliding the mixing element assembly back up the shaft of the tool, while still keeping the material stripping element held against the vessel to cover its opening. As the mixing element is retracted, it feeds back through the stripping element, and whatever material residue that remains sticking to it is stripped off by the said stripping element, leaving substantially all of it inside the vessel. After the mixing element assembly is brought fully back to its retracted position on the shaft, the lock screw is tightened by hand and the tool is set aside, with the material in the vessel now being mixed.

DETAILED DESCRIPTION

Apparatus Construction

Figure 1:
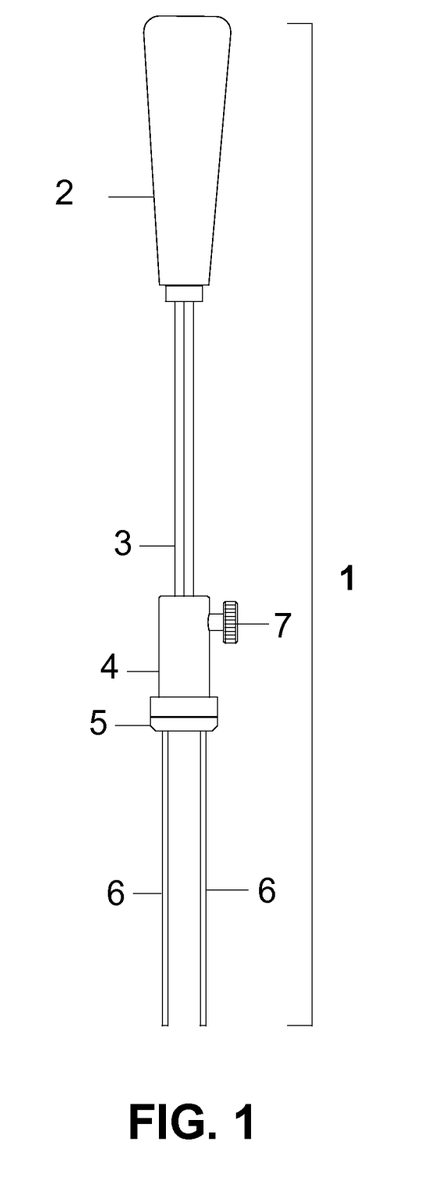
FIG. 1 illustrates the side view of an assembled mixing tool apparatus with the mixing element assembly fully extended.

FIG. 1 illustrates the side view of one embodiment of an assembled mixing tool apparatus 1 comprising: a handle 2; a shaft 3; a bushing 4; a material stripping element 5; a mixing element 6; a lock screw 7. The said apparatus 1 is illustrated with the mixing element 6 in the extended position.

Figure 2:
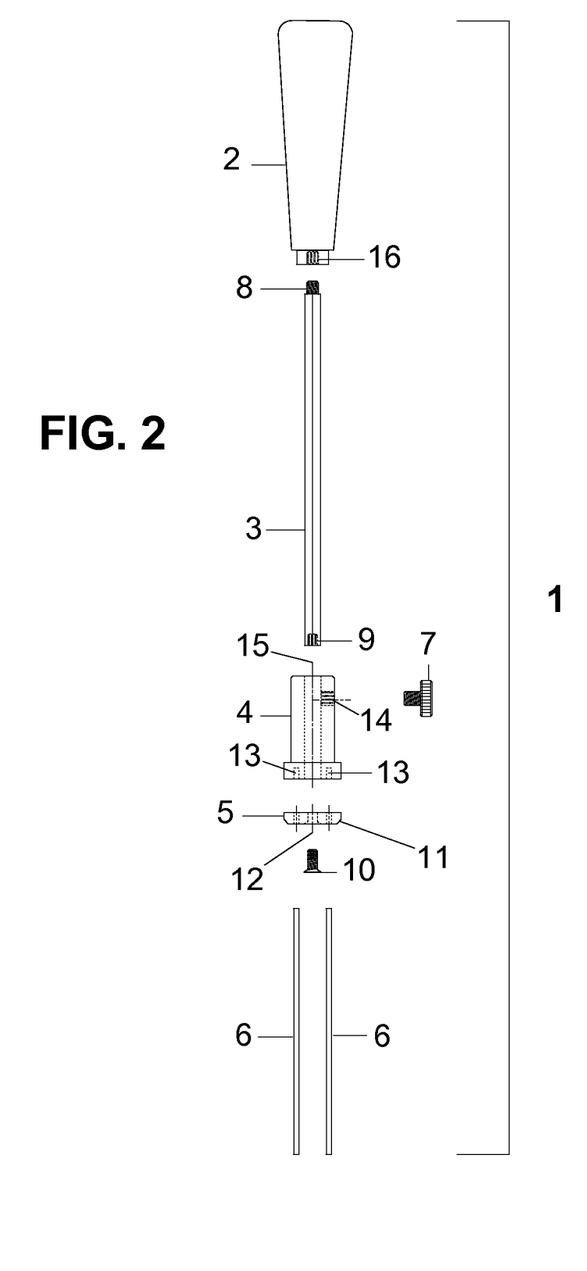
FIG. 2 illustrates an exploded side view of a mixing tool apparatus.

FIG. 2 illustrates an exploded side view of the apparatus 1. The handle 2, which is typically fabricated from metal and overmolded or otherwise covered with a rubber sleeve to facilitate gripping, has a threaded hole 16 that attaches to the male threaded end 8 of the shaft 3.

The said shaft 3 in this illustrated embodiment is metal and has a hexagonal shape. The female threaded end 9 of the shaft 3 secures to the material stripping element 5 with a screw or rivet 10 that is first inserted through a center hole 12 in the said element 5. The said element 5 is typically constructed of metal machined to a desired specification, such as in a disc shape, and may include a predetermined chamfer 11 around its periphery if desired.

The mixing element 6 is shaped like a rod or another desired geometry and typically fabricated from a rigid metal. The said element 6, of which two are shown in this illustration but at least one is sufficient without departing from the spirit of the invention, is inserted into the blind hole(s) 13 of the bushing 4 and permanently secured therein by brazing. However, it shall be appreciated, in an alternative embodiment the mixing element 6 could be removably secured to the said bushing 4 either by using a set screw (not shown) tapped into the side wall of the said bushing 4 to mechanically secure the said element 6 in the said blind hole 13. Or alternatively, by making the blind hole 13 and one end of the mixing element 6 threaded (also not shown), so the said element 6 can be screwed into the said hole 13.

The lock screw 7 screws into a threaded hole 14 tapped into the side wall of the bushing 4. The said lock screw 7 illustrated is a thumb screw, allowing it be adjusted without the use of tools. However, it shall be appreciated equivalent types of locking means serving the same purpose may alternatively be used without departing from the spirit of the invention.

The bushing 4 has a center hole 15 extending through its longitudinal length, and is in the shape of a hexagon for at least some of that length, which is typically accomplished by broaching a first drilled round through hole. The threaded hole 14 intersects with the center through hole 15 of the bushing 4, so if the lock screw 7 is tightened beyond a certain point, it will extend into the said through hole 15 space.

Apparatus Assembly

Figure 3:
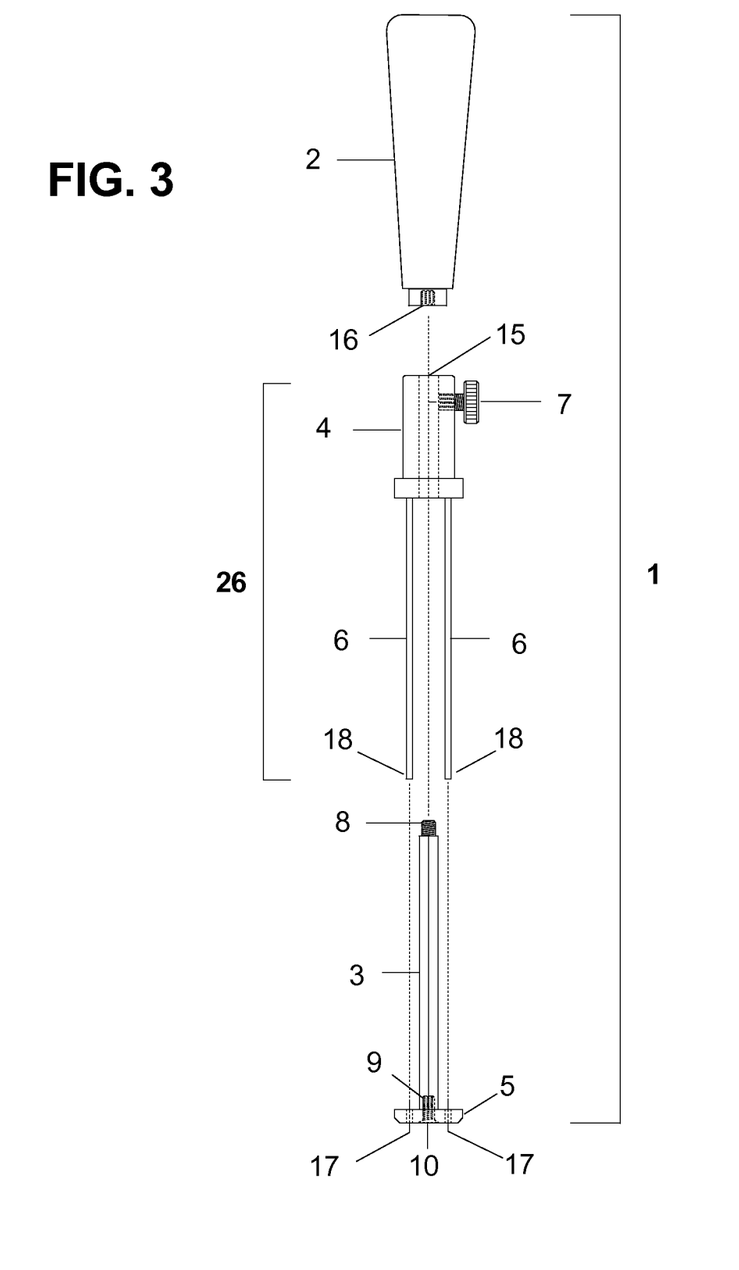
FIG. 3 illustrates an exploded side view of a mixing tool apparatus with some components already pre-assembled.

In the embodiment illustrated in FIG. 3 the apparatus is typically constructed by first assembling certain components with other components to create sub-assemblies, and then joining those sub-assemblies together to create the finished apparatus 1. In particular, the bushing 4, the mixing element(s) 6, and lock screw 7 are joined together in the manner previously described, and in combination they create a mixing element assembly 26 that is slidably repositionable along the shaft 3. Separately, the shaft 3 and the material stripping element 5 are joined together by means of the screw or rivet 10, as was also previously described. Then, the shaft 3 is fed through the center hole 15 in the bushing 4 until it exits the other side where its threaded male end 8 is screwed into the threaded hole 16 of the handle 2. While simultaneously, the tips 18 of the mixing element(s) 6 are inserted through the matching holes 17 in the material stripping element 5. The said matching holes 17, more particularly, are through holes with a geometry that particularly accommodates the geometry of the mixing element(s) 6.

With the apparatus 1 now assembled, the mixing element assembly 26 can slide back and forth along the shaft 3. Forward to extend the mixing elements 6 through the holes 17 of the material stripping element 5, and backward (towards the handle 2) to retract the mixing elements 6 until their tips 18 are flush with the material stripping element 5.

Figure 4:
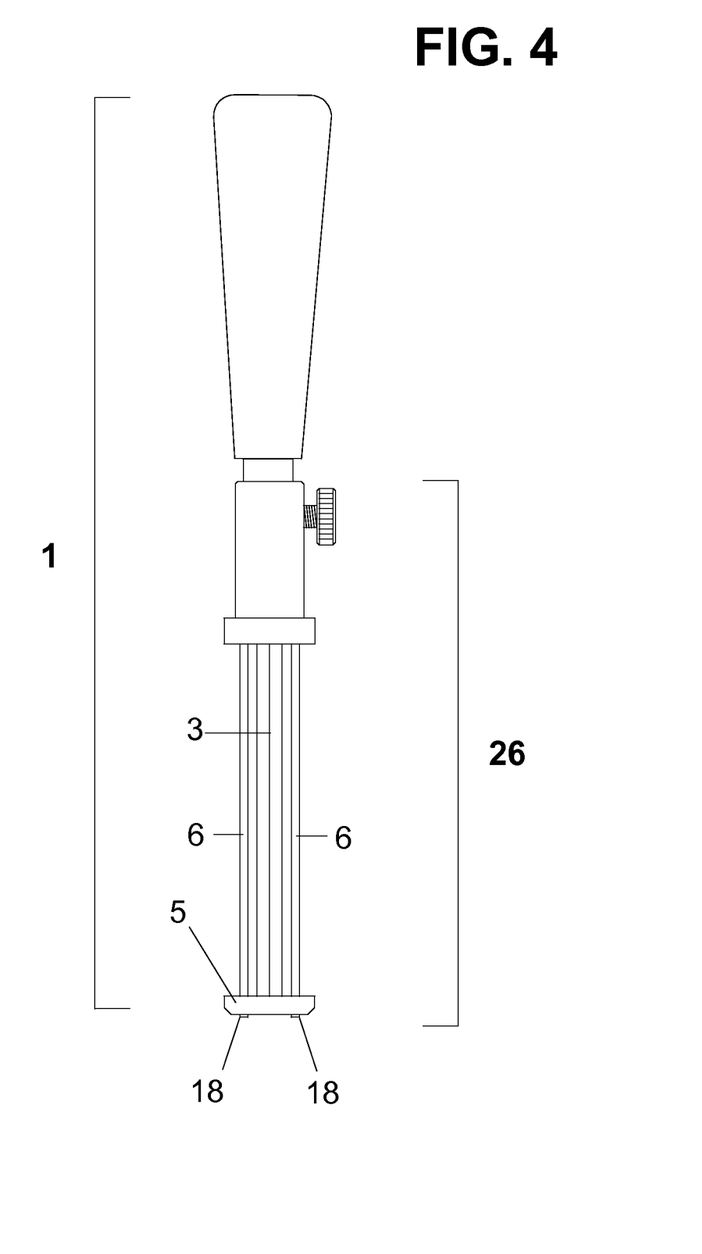
FIG. 4 illustrates the side view of an assembled mixing tool apparatus with the mixing element assembly fully retracted.

Accordingly, FIG. 4 illustrates the apparatus 1 with the mixing element assembly 26 in its fully retracted position on the shaft 3 with the tips 18 of the mixing elements 6 substantially flush with the bottom surface of the material stripping element 5.

Apparatus Operation and Best Mode

With the mixing element assembly 26 in its retracted position on the shaft 3, the apparatus 1 is typically first positioned over a vessel containing the material desired to be mixed, with the stripping element 5 in close communication with the vessel to effectively cover its opening. The mixing element 6 is then extended through the stripping element 5 and into the vessel opening by sliding the mixing element assembly 26 down the shaft 3 of the apparatus 1. The lock screw 7 is then tightened to keep it in that extended position. The apparatus 1 is then rotated, either by hand or automatically, to mix the material in the vessel. When the mixing operation is complete, the lock screw 7 is loosened and the mixing element 6 is withdrawn from the vessel by sliding the mixing element assembly 26 back up the shaft 3 of the apparatus 1, while still keeping the material stripping element 5 held against the vessel opening. As the mixing element 6 is retracted, it feeds back through the stripping element 5, and whatever material residue remains sticking to it is stripped off by the said stripping element 5, leaving substantially all of it inside the vessel. It shall be appreciated, by keeping the stripping element 5 held against the vessel while retracting the mixing element 6, the apparatus 1 also serves, in at least one embodiment, as a means to prevent the vessel from being dislodged or otherwise moved or lifted out of its place when the said material stripping function is being performed.

In any event, after the mixing element assembly 26 is brought fully back to its retracted position on the shaft 3, the lock screw 7 is tightened by hand and the apparatus 1 is set aside, with the material in the vessel now being mixed.

Figure 5:
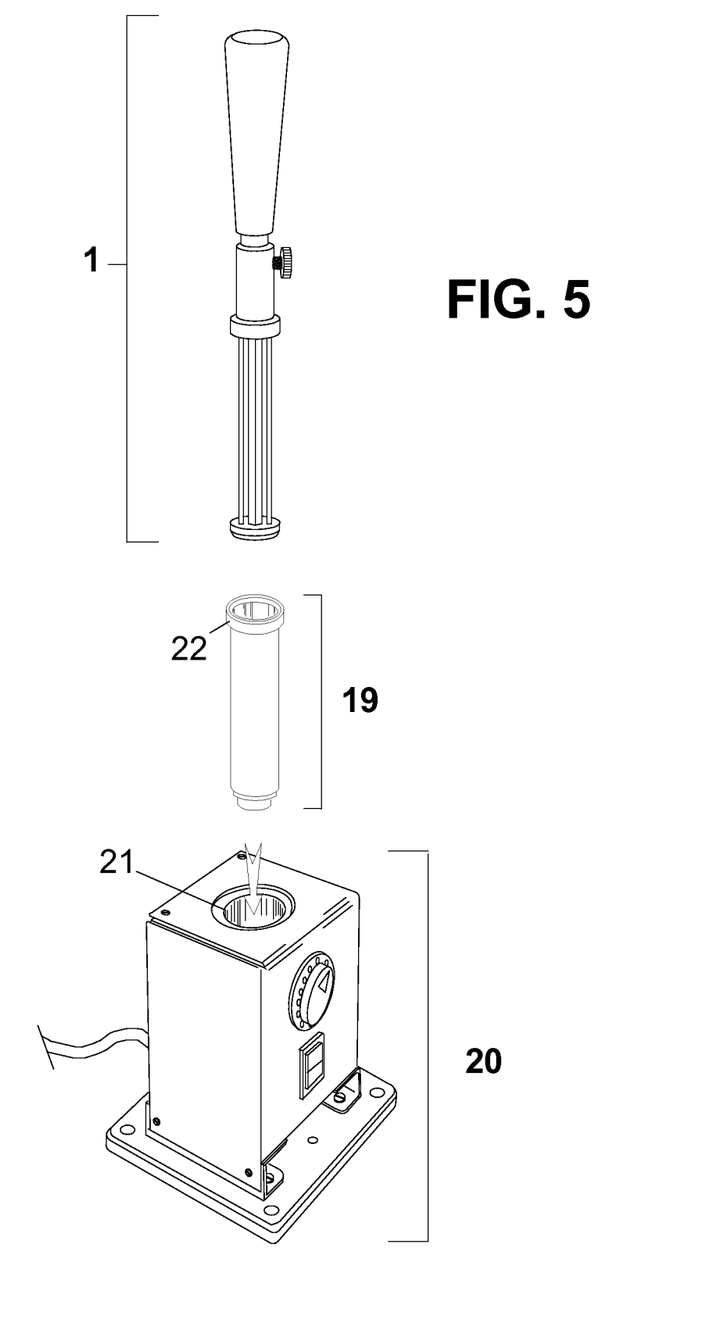
FIG. 5 illustrates one embodiment of a mixing tool apparatus being employed in a system.

Although the apparatus 1 may be employed for other uses, it is particularly suitable for use in a system for mixing molten polymers. Accordingly, as illustrated in FIG. 5 one such system particularly suitable for use in the marketplace comprises: the mixing tool apparatus 1; an injection tube assembly 19; and an injection tube assembly support apparatus 20. In general terms, the assembly 19 comprises the vessel for containing materials desired to be mixed, which in this system are typically polymers. The apparatus 20 serves as a means to removably secure and support the said assembly 19 in a vertical orientation, providing the apparatus 1 with unobstructed access to the vessel opening of said assembly 19 from above. The said apparatus 20 also serves to control the temperature of the assembly 19, typically for the purpose of melting the polymer materials contained therein.

The basic procedure when employing the apparatus 1 in cooperation with the assembly 19 and the apparatus 20 is to first turn on the power to apparatus 20 and set the desired temperature. Then, insert assembly 19 into the top hole 21 of apparatus 20 until it rests on its lip 22 or other similar feature around its top periphery. Then, fill the vessel of the assembly 19 with the material desired to be mixed and wait until it melts. Then, with the mixing element assembly 26 in its retracted position, place the apparatus 1 over the assembly 19 until the stripping element 5 comes in close communication with the lip 22 surrounding the vessel opening of the said assembly 19.

Because in this embodiment the stripping element 5 is preferably constructed to accommodate a predetermined injection tube assembly 19, the diameter and contours of the said element 5 are of a particular configuration, such that when it is placed in close communication with the lip 22 of said assembly 19, it effectively covers the vessel opening with a close fit, thus preventing substantially any material from escaping during the mixing operation.

Next, the lock screw 7 is loosened and the mixing element 6 is extended through the stripping element 5 into the assembly 19 vessel by sliding the mixing element assembly 26 downward along the shaft 3. When the mixing element 6 is completely extended into the assembly 19 vessel, the lock screw 7 is then tightened.

The handle 2 of the apparatus 1 is then rotated by the user causing the mixing element 6 to rotate inside the assembly 19 vessel and mix the material. All the while making sure to keep the stripping element 5 held in close communication with the lip 22 of assembly 19.

When the material is sufficiently mixed, the user then loosens the lock screw 7 and slides the mixing element assembly 26 back up the shaft 3, causing the mixing element 6 to withdraw from the assembly 19 vessel, while still holding the stripping element 5 against the lip 22 to cover the vessel opening. As the mixing element 6 retracts through the close fitting holes 17 in the stripping element 5, whatever material residue there remains sticking to it is stripped off, leaving substantially all of it inside the assembly 19 vessel.

As indicated earlier, the apparatus 1 may also serve to prevent the assembly 19 from being pulled out of the hole 21 when the mixing element 6 is being withdrawn therefrom, which could happen particularly when mixing polymers, because they are often viscous and sticky in their molten state. However, because the stripping element 5 remains held against the lip 22 of the assembly 19 when the element 6 is being withdrawn, the said assembly 19 remains in its place.

In any event, when the mixing element assembly 26 is fully retracted on the shaft 3, the lock screw 7 is retightened and the apparatus 1 is removed from its position above the assembly 19 by the user and set aside. Typically at this point the assembly 19 is also removed from apparatus 20, either by hand or if too hot, with tongs or some other desired means suitable for gripping the assembly 19, and then placed in a separate apparatus for analysis of the now mixed material, or alternatively for some secondary process, such as securing the said assembly 19 in an injection molding machine to produce an injection molded part with the mixed material.

Detailed alternative embodiments of the assembly 19 and the apparatus 20 and related information are disclosed in U.S. Provisional Application Ser. Nos. 61/776,758 and 61/776,765 and 61/776,767 all filed on Mar. 11, 2013, and 61/777,500 filed on Mar. 12, 2013, and 61/801,888 filed on Mar. 15, 2013, and the co-pending U.S. Non-Provisional Applications entitled: Support Apparatus for Injection Tube Assembly; Material Stripping Apparatus for External Mixing Element; System and Method for Mixing Polymers and Producing an Injection Molded Part; Injection Tube Assembly with Integrated Material Stripping Element and a Polymer Mixing System for Employing the Same, all filed on the same day as this U.S. Non-Provisional application, and all hereby incorporated by reference in their respective entireties.

Additional details about an injection molding apparatus that is suitable for use in cooperation with the system described above and illustrated in FIG. 5 can be found in U.S. Pat. Ser. Nos. 8,070,469 and 7,494,332 and D559,285 along with their preceding provisionals and continuations extending therefrom. All of which are also included herein by reference in their respective entireties.

Some Alternative Embodiments, without Limitation

In one alternative embodiment of the apparatus 1; the handle 2 may be eliminated in favor of an extended length shaft 3. This allows the apparatus 1 to be attached to an overhead mixing device with a motor, which can then rotate the apparatus 1 automatically rather than with the user's hand. When employing the apparatus 1 according to this alternative embodiment, the said extended portion of the shaft 3 is typically secured in the chuck or collet of an overhead mixer, with the mixing element assembly 26 in its retracted position on the shaft 3. Once secured, the apparatus 1 is then positioned over the opening of vessel containing the materials desired to be mixed.

When the materials inside the vessel are ready to mix, the chuck of the overhead mixer is then loosened and the (extended) shaft 3 of the apparatus 1 is lowered until the stripping element 5 comes in close communication with the top of the vessel opening. The chuck of the overhead mixer is then retightened around the extended portion of the shaft 3. Thereby holding the said element 5 in that lowered position against the vessel, and covering its opening. However, with light enough contact between them that the said element 5 can still be easily rotated by the mixer.

The lock screw 7 is then loosened and the mixing element assembly 26 is slid down the shaft 3, which extends the mixing element 6 through the stripping element 5 and into the vessel. The lock screw 7 is then retightened to lock the assembly 26 in that extended position. The mixing device is then turned on to mix the materials, causing the mixing element 6 to rotate within the vessel.

When materials in the vessel are sufficiently mixed, the mixer is shut off and the lock screw 7 of the apparatus 1 is loosened. The mixing element assembly 26 is then slid up the shaft 3 to withdraw the mixing element 6 from the vessel and back through the stripping element 5, thus stripping off any material residue in the process, leaving substantially all of it in the said vessel. When the mixing element assembly 26 is back to its retracted position on the shaft 3, the lock screw 7 is again retightened.

The chuck of the overhead mixer is then loosened and the apparatus 1 is either removed and set aside, or the (extended) shaft 3 of the apparatus 1 is slid up further into the chuck so the stripping element 5 is no longer in close communication with the vessel opening, allowing the said vessel to be removed for some secondary operation with the now mixed materials.

It shall be appreciated, in this alternative embodiment the (extended) shaft 3 essentially serves as both the handle 2 and the shaft 3, in that it provides both a means suitable for gripping, typically with an overhead mixer chuck, and its previously described function as a shaft 3.

Figure 6A:
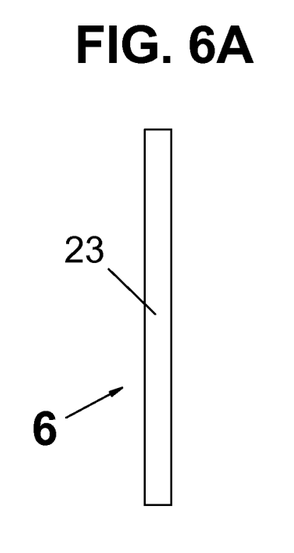
FIGS. 6A and 6B each illustrate an alternative embodiment of a mixing element.
Figure 6B:
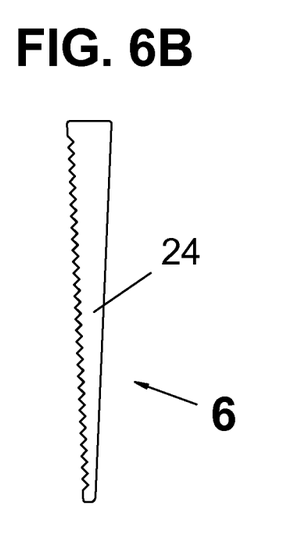

The mixing element 6 may also comprise alternative constructions and configurations from those already described herein without departing from the spirit of the invention. Two such alternative embodiments of the mixing element 6, without limitation, are illustrated in FIG. 6A and FIG. 6B. In particular, in one alternative embodiment as shown in FIG. 6A, the mixing element 6 is the shape of a flat rectangular blade 23. In another alternative embodiment as shown in FIG. 6B, the mixing element 6 is in the shape of a flat angled blade 24 with serrations extending along at least a portion of at least one edge.

Figure 7:
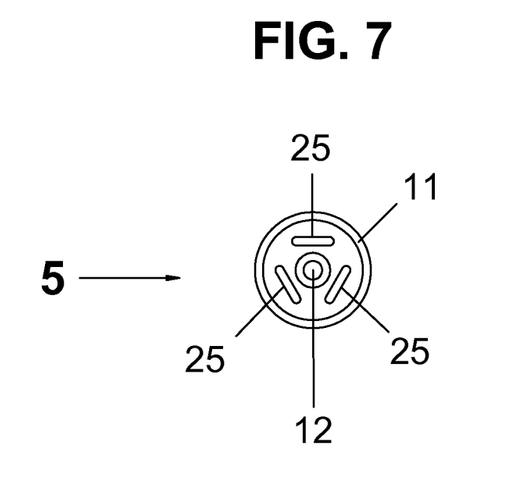
FIG. 7 illustrates an alternative embodiment of a material stripping element.

When the mixing element 6 is constructed according to a particular alternative embodiment, the hole(s) 17 of the stripping element 5 are likewise constructed in an embodiment that properly accommodates the embodiment of the element 6. For example, FIG. 7 illustrates the bottom view of an exemplary alternative embodiment of the stripping element 5 that comprises three slotted holes 25, which would likely accommodate a mixing element 6 in an embodiment that comprises three flat blades, secured to the bushing 4 in the same orientation as the said slotted holes 25 are arranged. The said stripping element 5 in FIG. 7 is also shown with chamfered center hole 12 to accommodate its attachment to the shaft 3 by means of a countersink screw 10 (not shown).

The stripping element 5 may also comprise other alternative embodiments and features, such as having a contoured external surface. For example, FIG. 7 illustrates the stripping element 5 with a chamfer 11 around its outer periphery, which allows it to better fit the opening of a predetermined vessel opening having a similar chamfer around its inner periphery, thereby reducing the likelihood materials will escape from the said vessel opening during the mixing operation. More elaborate means may also be employed to accomplish a preferred fit, such as without limitation incorporating a silicone O-ring or similar sealing means into the said element 5, typically around its outer periphery where it comes in close communication with a vessel opening.

Both the mixing element 6 and stripping element 5 may comprise various other features and enhancements as well to improve their functionality. For example without limitation, plating or coating the said elements 5, 6 to make their surfaces more non-stick or wear resistant, or magnetizing the mixing element 6 to cause a metallic filler or additive to flow differently as it mixes in with a molten polymer.

In another alternative embodiment, the shaft 3 may comprise a shape other than the hexagon already described herein without departing from the spirit of the invention. The hexagonal shape prevents the mixing element assembly 26 from rotating around the shaft 3 when the tool is in operation. However, this can be achieved with other profile shapes as well, such as square shaft or a round shaft with a notch or keyway slot. Alternatively, the bushing 4 and the material stripping element 5 may be constructed to interlock with each other to prevent the mixing element assembly 26 from rotating independently from the shaft 3 when in its fully extended position. For example, one way the bushing 4 and stripping element 5 may be alternatively constructed to interlock with each other is to have a pin or pins extending from the element 5, and a receiving hole or holes machined into the bushing 4 surface, such that when the assembly 26 is in the fully extended position and the bushing 4 comes in close communication with the element 5, the said pin(s) of the element 5 will insert into the said hole(s) of the bushing 4 to create the interlock. Alternatively, the bushing 4 may comprise the pin(s) and the element 5 may comprise the holes(s).

Depending on which alternative embodiment of the apparatus 1 is being constructed, the material stripping element 5 could either rotate freely on the shaft 3 after being secured thereto, or could remain fixed in one position relative to the shaft 3. For example, if the shaft 3 is constructed with a geometry that prevents the bushing 4 from freely rotating around it, such as a hexagonal shape, the material stripping element 5 could be secured the end of the shaft 3, but still retain the ability to rotate freely, although it's not required. Alternatively, if the shaft 3 is round for example, and does not inherently provide a means to prevent the bushing 4 from rotating around it, the stripping element 5 could instead be configured to serve that purpose by fixedly securing it to the end of the shaft 3, so it does not have the ability to rotate freely. Whereas, in this scenario, the bushing 4 and stripping element 5 could be constructed to interlock with each other, so whenever the bushing 4 is in its fully extended position, it interlocks with the (fixedly secured) stripping element 5, thereby preventing it from rotating around the shaft.

As mentioned earlier, the lock screw 7 may also be constructed according to alternative embodiments without departing from the spirit of the invention. For example, without limitation; the said lock screw 7 may be a spring loaded thumb screw designed to automatically interlock with the shaft 3 at predetermined points, such as when the assembly 26 is fully retracted and when the assembly 26 is fully extended, thus eliminating the need for the user to manually turn the knob of the lock screw 7. Instead, the said user would simply need to pull back on the spring loaded knob to release the assembly 26 from being interlocked with the shaft 3, or alternatively the stripping element 5.

Some Advantages, without Limitation

Providing a mixing tool 1 that strips material residue from its embodied mixing element 6. The said tool 1 in at least one embodiment comprising: a handle 2, a shaft 3, a repositionable mixing element assembly 26, and a material stripping element 5.

Providing a mixing tool 1, wherein in at least one alternative embodiment, the shaft 3 has an extended length portion, allowing it to also function as the handle 2.

Providing a mixing tool 1, wherein the mixing element 6 slidedly retracts and extends through the material stripping element 5. For example, when the assembly 26 is manually repositioned along the shaft 3 by the user.

Providing a mixing tool 1, wherein the mixing element assembly 26 slidedly retracts and extends along the shaft 3. For example, when the said assembly 26 is manually repositioned along the shaft 3 by the user.

Providing a mixing tool 1, wherein the mixing element assembly 26 is removably lockable in a desired position along the shaft 3. For example, without limitation, by tightening the lock screw 7.

Providing a mixing tool 1, wherein the material stripping element 5 is optimized for the opening of a predetermined vessel. For example, without limitation, by adding a chamfer 11 around its outer periphery, to better fit the opening of a predetermined vessel with a similar chamfer around its inner periphery.

Providing a mixing tool 1, wherein the material stripping element 5 is optimized for the geometry of its embodied mixing element 6. For example, without limitation, by closely matching the hole geometry of stripping element 5 to the shape of the said embodied mixing element 6.

Providing a mixing tool 1, wherein in an alternative embodiment, the mixing element assembly 26 removably interlocks with the material stripping element 5 to prevent the said assembly 26 from rotating around the shaft 3.

Providing a mixing tool 1, wherein in one embodiment, the mixing element 6 is removably attached to the mixing element assembly 26, for example by unscrewing the said element 6 from the bushing 4 of the assembly 26.

Providing a mixing tool 1, wherein at least one element prevents the mixing element assembly 26 from rotating on the shaft 3, for example without limitation, the lock screw 7.

It shall be appreciated; the apparatus 1 is not limited to the above advantages. Also, not all of the recited advantages must be present simultaneously for the apparatus 1 to function as intended.

What is claimed is:

1. A mixing tool, comprising: a shaft with a grippable length at one end and a material stripping element attached to the other end; a mixing element assembly comprising at least one mixing element slidably retractable and extendible through the material stripping element and a bushing slidably repositionable along the shaft and removably lockable in at least one position.

2. The mixing tool of claim 1, wherein the grippable length of the shaft comprises a handle suitable for gripping with a user's hand.

3. The mixing tool of claim 1, wherein the mixing element assembly is removably lockable in at least one position by means of a lock screw.

4. The mixing tool of claim 1, wherein the material stripping element geometry is optimized to effectively cover a vessel opening.

5. The mixing tool of claim 1, wherein the material stripping element geometry is optimized for the mixing element geometry.

6. The mixing tool of claim 1, wherein the mixing element assembly removably interlocks with the material stripping element.

7. The mixing tool of claim 1, wherein the mixing element is removably attached to the mixing element assembly.

8. The mixing tool of claim 1, wherein at least one element prevents the mixing element assembly from rotating on the shaft.

* * * * *